(12) United States Patent
Krivopaltsev et al.

(10) Patent No.: US 10,356,318 B1
(45) Date of Patent: Jul. 16, 2019

(54) LONG DOCUMENT CAPTURE ON MOBILE DEVICES

(71) Applicant: INTUIT INC., Mountain View, CA (US)

(72) Inventors: Eugene Krivopaltsev, Mountain View, CA (US); Samir Safi, Mountain View, CA (US); Boris Fedorov, Mountain View, CA (US); Daniel Lee, Mountain View, CA (US)

(73) Assignee: INTUIT, INC., Mountain View, CA (US)

( * ) Notice: Subject to any disclaimer, the term of this patent is extended or adjusted under 35 U.S.C. 154(b) by 76 days.

(21) Appl. No.: 15/499,677

(22) Filed: Apr. 27, 2017

(51) Int. Cl.
| | |
|---|---|
| *H04N 5/232* | (2006.01) |
| *G06T 3/40* | (2006.01) |
| *G06K 9/34* | (2006.01) |
| *G06K 9/62* | (2006.01) |
| *G06K 9/78* | (2006.01) |

(52) U.S. Cl.
CPC ......... *H04N 5/23238* (2013.01); *G06K 9/344* (2013.01); *G06T 3/4038* (2013.01); *G06K 9/6215* (2013.01); *G06K 9/78* (2013.01); *G06K 2209/01* (2013.01); *H04N 5/23216* (2013.01)

(58) Field of Classification Search
None
See application file for complete search history.

(56) References Cited

U.S. PATENT DOCUMENTS

| | | | | |
|---|---|---|---|---|
| 6,493,469 | B1* | 12/2002 | Taylor | H04N 1/1903 |
| | | | | 348/E7.079 |
| 9,058,331 | B2* | 6/2015 | Graham | H04L 51/32 |
| 2006/0013444 | A1* | 1/2006 | Kurzweil | G06F 17/2211 |
| | | | | 382/114 |
| 2012/0008174 | A1* | 1/2012 | Sohma | G06K 9/00469 |
| | | | | 358/448 |
| 2012/0072859 | A1* | 3/2012 | Wang | G06K 9/00442 |
| | | | | 715/764 |
| 2013/0085908 | A1* | 4/2013 | Singh | G06Q 10/06 |
| | | | | 705/30 |
| 2014/0055826 | A1* | 2/2014 | Hinski | H04N 1/3876 |
| | | | | 358/473 |
| 2014/0067631 | A1* | 3/2014 | Dhuse | G06Q 40/10 |
| | | | | 705/30 |
| 2014/0363081 | A1* | 12/2014 | Bell | G06K 9/54 |
| | | | | 382/182 |
| 2016/0042416 | A1* | 2/2016 | Slowakowski | G06Q 10/06315 |
| | | | | 705/7.29 |
| 2016/0092745 | A1* | 3/2016 | Wada | G06K 9/3283 |
| | | | | 382/177 |
| 2016/0210507 | A1* | 7/2016 | Abdollahian | G06T 3/60 |
| 2016/0307059 | A1* | 10/2016 | Chaudhury | G06K 9/00463 |

* cited by examiner

*Primary Examiner* — Chikaodili E Anyikire
(74) *Attorney, Agent, or Firm* — Patterson + Sheridan, LLP

(57) ABSTRACT

The present disclosure relates to capturing a document. In certain embodiments, Optical Character Recognition (OCR) is performed on each of a plurality of images to identify one or more character sequences in each image. Each image may comprise a portion of the document. In some embodiments, points of connection are identified among the plurality of images based on the one or more character sequences in each image. In certain embodiments, a unified image of the document is produced by stitching the plurality of images together based on the points of connection.

21 Claims, 6 Drawing Sheets

Fig. 5

LONG DOCUMENT CAPTURE ON MOBILE DEVICES

FIELD

Embodiments presented herein generally relate to document capture, and more specifically to capturing a high quality image of a long document such as a receipt.

DESCRIPTION OF THE RELATED ART

In the course of using a mobile application, it is sometimes useful to capture an image of a document. For example, a user of a financial management application may capture an image of a receipt related to a financial transaction for use within the application. In some cases, however, due to the limitations of cameras, such as restricted fields of view, a document may be too long to capture in a single image of sufficient quality to identify the document's textual content.

Existing solutions for capturing an image of a subject which is too long to fit within a camera's field of view are generally directed towards capturing a panoramic image of a wide space such as a landscape. These solutions involve merging multiple captured images by analyzing the images to identify points of overlap (e.g., based on intensity, saturation, color, and the like) and then stitching the multiple images together into a single image based on the points of overlap. These solutions may be effective in many cases, such as in capturing landscape photographs, but may not provide usable data for capturing the contents of documents for a variety of reasons. For example, because panoramic image capture and stitching is directed towards producing an aesthetically pleasing image rather than a readable copy of a document, the quality of the final image tends to be insufficient to reliably identify the text of a document. Additionally, inaccuracies in the stitching process can cause text to be scrambled, distorted, or otherwise unintelligible. Stitching techniques, such as blurring and fading between images, which are employed to generate a visually cohesive image, may degrade the quality of textual content captured in a panoramic image, which may result in the captured text being depicted in the final image in an unreadable form.

SUMMARY

One embodiment of the present disclosure includes a computer-implemented method for capturing a document. The method generally includes performing Optical Character Recognition (OCR) on each of a plurality of images to identify one or more character sequences in each image, wherein each of the one or more images comprises a portion of the document. The method further includes identifying points of connection among the plurality of images based on the one or more character sequences in each image. The method further includes producing a unified image of the document by stitching the plurality of images together based on the points of connection.

Another embodiment of the present disclosure includes a processor and a memory storing a program, which, when executed on the processor, performs the method for capturing a document.

Still another embodiment provides a non-transitory computer-readable storage medium having instructions, which, when executed on a processor, performs the method for capturing a document.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

FIG. 5 illustrates a plurality of images of a document being stitched together at points of connection according to embodiments of the present disclosure.

DETAILED DESCRIPTION

In order to capture an image of a long document, a plurality of images, each containing a portion of the document, may be captured and stitched together to form a unified image. Because the plurality of images may be captured by a user, many factors may affect the quality of the images (e.g., perspective, lighting, focus, and the like). Images may vary in perspective because, if the user captures the images using a mobile device, it may be difficult to hold the mobile device steady and at the same angle while capturing each image. Furthermore, existing methods of stitching images together tend to focus on identifying points of graphical commonality between the images. This approach is not ideal for long documents where the commonalities and differences between the images are generally textual.

In some embodiments of the present disclosure, a plurality of images is captured, optical character recognition (OCR) is performed on the images, and the images are then stitched together to form a high-quality unified image of the document based on points of overlap identified from the text detected in each of the images. OCR systems are generally used to detect text present in an image of a document (e.g., a financial document) and to convert the detected text into a machine readable representation. Stitching a plurality of images of a long document together based on text extracted using OCR rather than stitching the images together based on other aspects of the images (e.g., intensity, saturation, color, edges, and the like) results in a more accurate and readable unified image of the long document.

Figure 1:
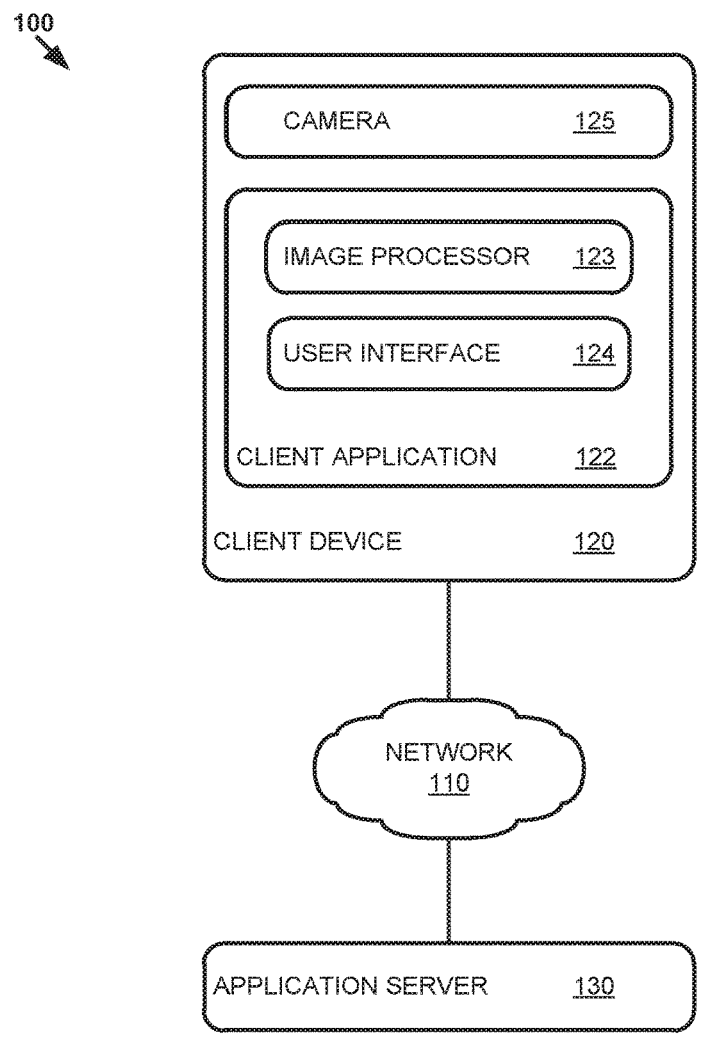
FIG. 1 illustrates an example computing environment within which certain embodiments of the present disclosure may be implemented.

FIG. 1 illustrates an example computing environment 100 within which certain embodiments of the present disclosure may be implemented. Computing environment 100 contains a client device 120 and an application server 130, which are connected by a network 110, such as the internet.

Client device 120 may, for example, comprise a computing device such as a mobile phone, a Personal Digital Assistant (PDA), a tablet computer, or a desktop or a laptop computer. Client device 120 includes a camera 125, which allows client device 120 to capture images. Because cameras have a limited field of view, a user of client device 120 may use camera 125 to capture a plurality of images of a long document such as a receipt so that the plurality of images may be stitched together according to embodiments of the present disclosure.

Client device 120 also executes a client application 122, which comprises an image processor 123 and a user interface 124. Client application 122 may, for example, comprise a software application which performs operations related to capturing long documents according to embodiments of the present disclosure. In some embodiments, client application may comprise a financial services application which interacts with web based services hosted on application server 130 over network 110 using application programming interface (API) calls. Client application 122 may invoke functionality exposed by an API, for example, using a Representational State Transfer function call (a RESTful function call), queries encapsulated in an HTTP POST request, a Simple Object Access Protocol (SOAP) request, or other protocols that allow client software to invoke functions on a remote system. In other embodiments, client application 122 does not interact with remote services, and executes all functionality locally on client device 120.

Image processor 123 may, for example, receive and process a plurality of images captured by camera 125 in order to produce a single unified image. For example, in the course of using client application 122, a user may use camera 125 to capture a plurality of images of a long document. The long document may be a receipt which the user captures for the purpose of extracting data for use in a financial services application. The receipt may be too long to fit within the field of view of the camera, and so the user may be prompted within user interface 124 of client application 122 to capture a series of images of the receipt so that image processor 123 may process the images in order to produce a single unified image of the receipt. In some embodiments, image processor 123 may analyze the images to determine whether they are of sufficient quality to continue with processing. If one or more images are not of sufficient quality (e.g., blurry, out of focus, dark, overexposed, or the like), client application 122 may prompt the user within user interface 124 to recapture the one or more images.

Once the plurality of images has been captured, image processor 123 performs OCR on the plurality of images in order to extract the text depicted in the images. Using OCR allows the images of a document to be stitched together more accurately than other known methods (e.g., stitching images together based on intensity, saturation, color, or edge data in the images), as it ensures that the integrity of the text is maintained. In one embodiment, each image is broken into a vertical stack of horizontal character sequences (e.g., line items in the receipt). When two consecutive character sequences (e.g., receipt line items) are shared between two of the images, these consecutive character sequences are identified as a potential point of connection (or candidate stitching couple). The two consecutive character sequences may comprise a top line (known as a verifier) and a bottom line (known as a stitching line). In certain embodiments, two consecutive character sequences (e.g., receipt line items) are used as a point of connection in order to rule out cases where a single character sequence may be repeated twice in the same receipt, and so may not be a point of overlap between two images. One example is "$0.99", which could be repeated in the same receipt. Therefore in this disclosure, the intention is to find an appearance of a true point of connection between two images which comprise fragments of a document.

For example, image processor 123 may identify character sequences (e.g., receipt line items) in the images. Image processor 123 may then use the character sequences to identify points of connection between the images. For example, if the same two lines of text are present in two different images, image processor 123 may determine that these images both depict the same two lines of text from the original document, and may identify these lines of text as a point of connection between the two images. Because performing OCR on an image does not always result in the correct set of characters being recognized in the image, however, in some embodiments, a similarity metric may be used to identify points of connection. This will be discussed in more detail below with respect to FIG. 3.

Image processor 123 may, after identifying the points of connection among the plurality of images, stitch the images together using the points of connection. For example, two images may be merged together such that the two lines of text which they share are lined up, and the text is not duplicated. In some embodiments, the two images may simply be joined together such that the shared sequences of characters are included at the end of the first image and the second image is cropped to begin immediately after the shared sequences of characters. Thus, the resulting unified image includes the full text of the original document in a sequential and readable form. Image processor 123 may then provide the unified image to user interface 124 to be displayed to the user for approval.

In some embodiments, image processor 123 may extract values from the unified image for use in client application 122. For example, in the context of a financial services application, a user may capture a receipt in order to extract one or more values (e.g., the total, subtotal, tax, date, last for digits of credit card, and the like) for use in the application. Image processor 123 may extract the requested value (e.g., the total) based on the machine-readable data produced using OCR previously on the plurality of images, and then provide the requested value to another component of the application to be used for its intended purpose (e.g., tax preparation or record keeping). The value may be identified based on rules stored within image processor 123 (e.g., the value of the total is preceded by the word "TOTAL" in the document).

User interface 124 may, for example, receive input from and provide output to a user of client device 120. In some embodiments, user interface 124 may be associated with a display device and one or more input devices (not shown) which allow the user to provide feedback. For example, image processor 123 may provide user interface 124 with data related to the processing of images so that a user can provide input related to the image processing (e.g., the unified image may displayed to the user for approval).

While the various components of client device 120 are depicted separately in FIG. 1, one or more of the components may be implemented together or separately, and certain functions of the components may be distributed across a plurality of physical or virtual devices. Furthermore, one or more values extracted from the unified image or one or more of the plurality of images may be uploaded to application server 130 for further processing (e.g., for calculations related to the use of the values in a financial services application).

Figure 2:
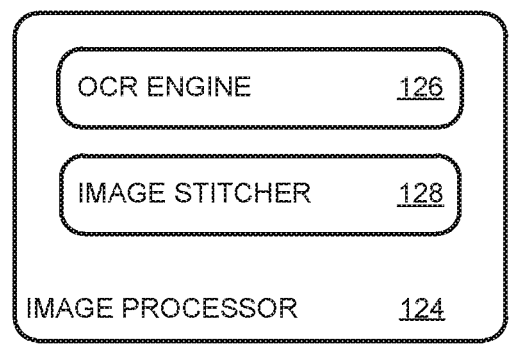
FIG. 2 illustrates an image processor according to certain embodiments of the present disclosure

FIG. 2 illustrates an image processor 123 according to certain embodiments of the present disclosure. Image processor 123 (which may be a part of client application 122, as shown in FIG. 1) comprises an OCR engine 126 and an image stitcher 128.

OCR engine 126 may perform OCR operations in order to detect text present in an image of a document (e.g., a financial document) and to convert the detected text into a machine readable representation. Text may include characters such as letters, numbers, and symbols. A plurality of images of a long document may be provided to OCR engine 126 in order to identify the text present in the images and thereby identify particular character sequences (e.g., line items of a receipt) in each image. OCR engine 126 may then provide the extracted text to image stitcher 128 so that points of connection may be identified between the images. Image stitcher 128 may perform operations for stitching a plurality of images of a document together in order to produce a unified image of the document. For example, image stitcher 128 may receive the plurality of images along with the text of the images extracted by OCR engine 126. Image stitcher 128 may identify points of connection among the plurality of images based on shared character sequences (e.g., line items) in the text of the images, and then join the images together at the points of connection. In some embodiments, image stitcher 128 may also use a similarity metric (such as an edit distance, which will be discussed in more detail below with respect to FIG. 3) when identifying shared character sequences in order to account for OCR errors. In certain embodiments, each two images which share a point of connection will be joined together such that the text which comprises the point of connection will be maintained in the first image and cropped out of the second image, such that the second image begins immediately after the text which forms the point of connection. The resulting image may comprise a unified image of the document with the text of the original document included sequentially and legibly.

Figure 3:
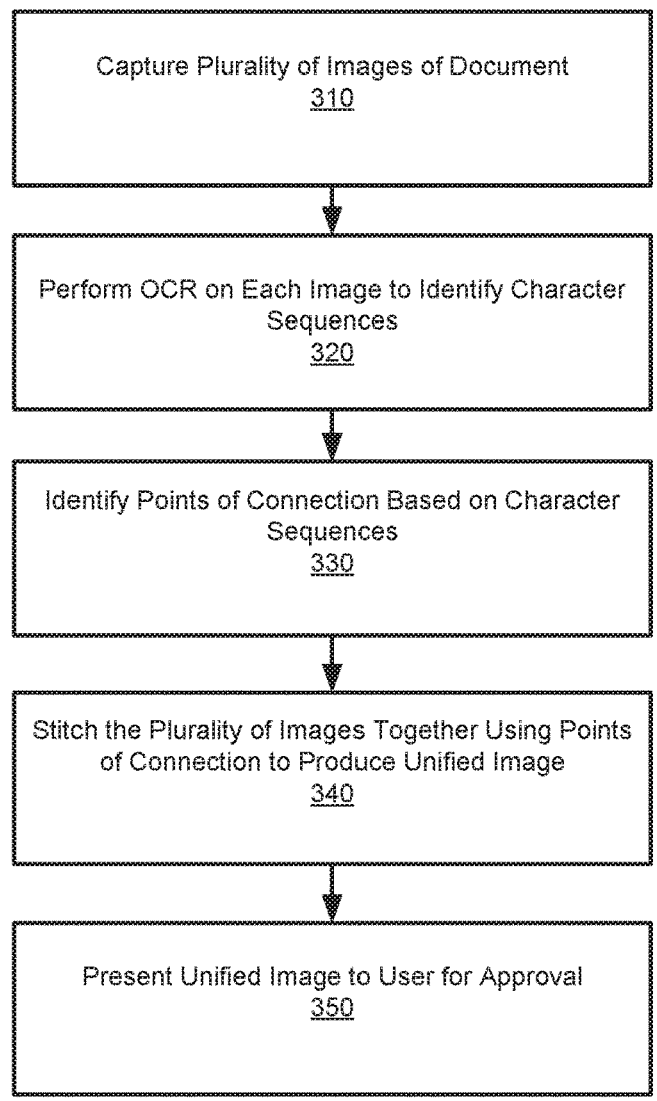
FIG. 3 illustrates example operations for capturing a document according to certain embodiments.

FIG. 3 illustrates example operations 300 for capturing a long document according to certain embodiments. Operations 300 may, for example, be implemented by client device 120.

As illustrated, operations 300 begin at step 310, where client device 120 captures a plurality of images of a document. For example, during the course of using a financial services application on client device 120, a user may need to capture a long document such as a receipt in order to extract one or more values from the document to use as input to the financial services application. The user may initiate a capture process through user interface 124 by which camera 125 is used to capture a plurality of images of the document. The user may capture the images, for example, by moving camera 125 from one end of the document to the other while taking multiple images. The images may have overlapping portions (e.g., two images may both include the same part of the original document because the camera 125 was not moved to an entirely new portion of the document before the next image was captured) and may vary in aspects such as angle, orientation, and quality. In some embodiments, the user may be prompted through user interface 124 to approve the images once they are captured. In other embodiments, once the images have been provided to image processor 123, if image processor 123 determines that the quality of one or more of the images is not sufficient (e.g., the image is too blurry, distorted, dark, or overexposed to recognize text using OCR), the user may be prompted through user interface 124 to re-capture the one or more images.

At step 320, client device 120 performs OCR to identify character sequences in each of the plurality of images. For example, image processor 123 may analyze each of the images using OCR to identify one or more character sequences. If the images each contain a portion of a receipt of a financial transaction, for example, the character sequences identified may comprise lines of text in the receipt. For example, the content of the receipt may include information such as a date, a name of a merchant, an identity of items purchased, prices of items purchased, a total cost of the transaction, a method of payment used by the customer in the transaction, and other information related to the financial transaction. Because the plurality of images contain overlapping portions of the document, one or more common character sequences (e.g., lines of text) may be contained in more than one image (e.g., a line item on the receipt may be at the bottom of one image and the same line item may be at the top of another subsequent image).

At step 330, image processor 123 identifies points of connection between the plurality of images based on the character sequences identified using OCR at step 320. For example, image processor 123 may identify one or more common character sequences shared by two of the images. When one or more character sequence in one image is shared by another image, image processor 123 may identify the one or more common character sequences as a point of connection between the two images. In some embodiments, a point of connection is only identified if a particular number of character sequences is shared in common between two images. For example, a point of connection may be identified only if at least two character sequences are shared in common between two images (e.g., at least two line items from the receipt are included in two different images). In other embodiments, after the points of connection have been identified by image processor 123, the user may be prompted through user interface 124 to approve and/or modify the points of connection, which is discussed in more detail below with respect to FIG. 4.

In some cases, errors may result from an OCR process. Thus, it may be necessary to use additional information to identify the points of connection between images. In some embodiments, where a perfect match is not identified between character sequences in two images, a point of connection may be identified based on a measure of similarity between one or more character sequences in each of the two images. For example, a Levenshtein distance (also known as edit distance) may be calculated by determining the edit distance between one or more character sequences in a first image and a corresponding one or more character sequences in a second image. A low Levenshtein distance between two sequences of characters may indicate that the sequences of characters are actually the same, and that the OCR was inaccurate. In some embodiments, if the Levenshtein distance between the one or more sequences of characters in the two images is below a particular threshold, image processor 123 may identify the one or more sequences of characters in each of the two images as a common character sequence. Accordingly, the common character sequence may be identified as a point of connection between the two images.

At step 340, client device 120 stitches the plurality of images together using the points of connection in order to produce a unified image of the document. For example, the images may be joined at the points of connection where a common character sequence was identified at step 330. The images are joined such that a unified image of the document results. Because operations 300 result in a higher quality image of the document than is achieved through other methods of capturing a long document, the unified image may allow for information to be extracted with greater accuracy and precision so the information can be relied upon for various purposes (e.g., financial record keeping or tax preparation).

At step 350, client device 120 presents the unified image of the document to the user for approval. For example, the unified image may be displayed to the user via user interface 124. The user may approve the displayed unified image so that, for example, values may be extracted from the unified image using the machine-readable data produced using OCR previously on the plurality of images.

Figure 4:
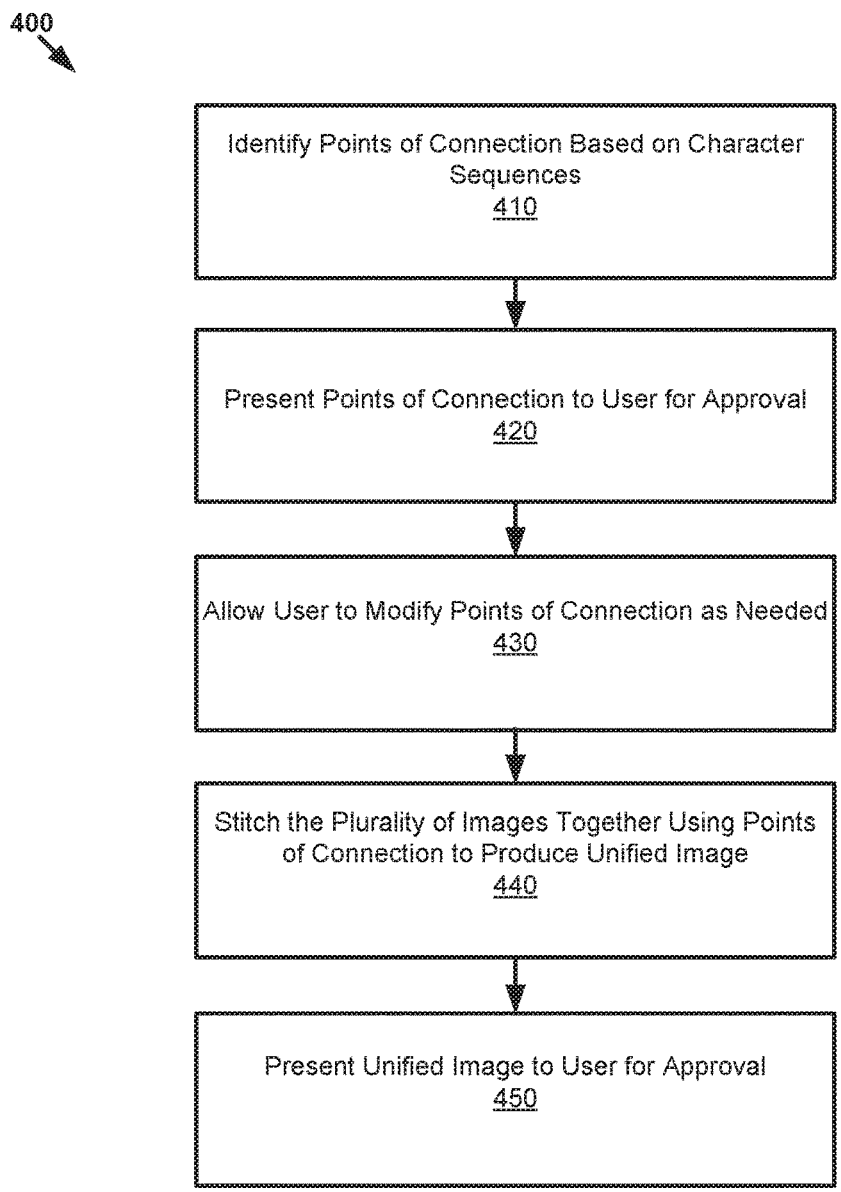
FIG. 4 illustrates example operations for allowing a user to approve and modify aspects of the document capture process according to certain embodiments.

FIG. 4 illustrates example operations 400 for allowing a user to approve and modify aspects of the document capture process according to certain embodiments.

At step 410, client device 120 identifies points of connection among the plurality of images. As described above with respect to FIG. 3, this may involve performing OCR on each of the plurality of images to identify common character sequences shared between images. In some embodiments, as discussed above, this may involve determining a Levenshtein distance between sequences of characters in the plurality of images to account for inaccuracies in the OCR process.

At step 420, client device 120 presents the points of connection to the user for approval. For example, user interface 124 may display the plurality of images joined at the points of connection identified at step 410, with the points of connection indicated, and may prompt the user to approve the points of connection as displayed. The user may choose to approve the points of connection, or may proceed to step 430 and modify the points of connection.

At step 430, the user may modify the points of connection as needed. For example, if the user is not satisfied with the points of connection displayed, the user may modify the points of connection through interaction with user interface 124. In some embodiments, the user may be enabled to interact with the images through user interface 124 using drag and drop functionality (e.g., through interacting with a touch screen of a mobile device using gestures such as panning to change a stitching position and pinching to adjust a horizontal image location and image edges). For example, the user may be able to move, resize, crop, zoom, and otherwise edit the appearance and arrangement of each of the plurality of images within user interface component 124. Thus, the user may modify the points of connection between the images. When the user is satisfied with the points of connection, the user may provide approval to stitch the images together at the points of connection and as they are displayed by user interface component 124.

At step 440, client device 120 stitches the plurality of images together at the points of connection, as approved by the user, to produce a unified image of the document. For example, image processor 123 may join the plurality of images together at the points of connection approved by the user at step 420 or 430, to produce a high quality unified image of the document.

At step 450, client device 120 presents the unified image of the document to the user for approval. For example, the unified image may be displayed to the user via user interface 124. The user may approve the displayed unified image so that, for example, values may be extracted from the unified image using the machine-readable data produced using OCR previously on the plurality of images. In one embodiment, for example, image processor 123 may extract the date and the total cost of a transaction from a receipt depicted in the unified image. The extracted values may be displayed to the user via user interface 124, and may then be employed for other purposes within client application 122 (e.g., a value within the application may be updated in order to maintain accurate financial records).

The operations depicted in FIGS. 3 and 4 may, for example, be performed in the course of using a financial services application executing on client device 120. A user may, for instance, need to extract information from a long receipt for use in an accounting application. The user may initiate the image capture through interactions with the accounting application, and the values extracted from the unified image may be used to populate fields in the accounting application. For example, a date and total cost of a transaction extracted from an image of a receipt may be used to populate date and total cost fields within the accounting application.

Figure 5:
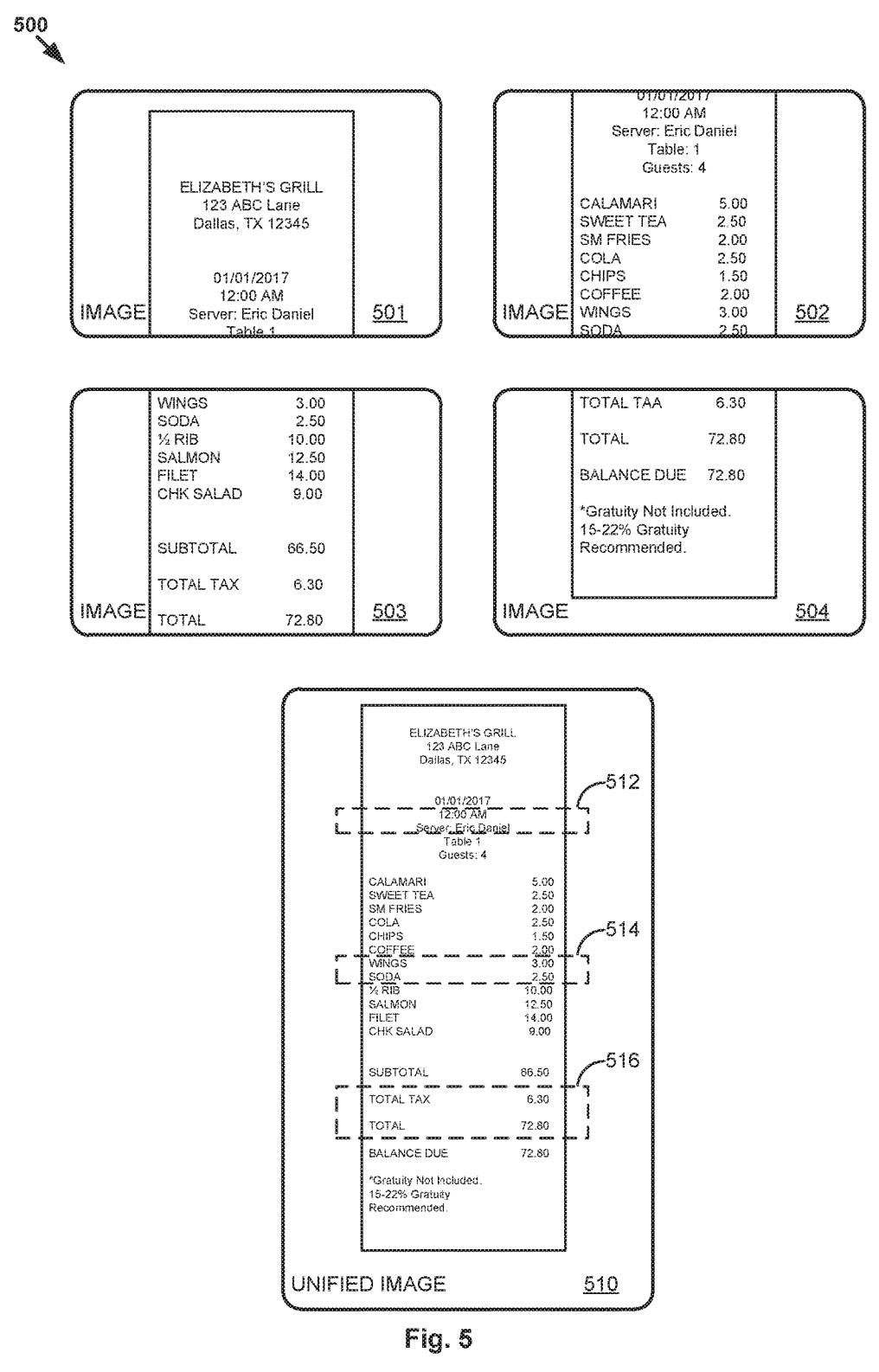

FIG. 5 illustrates a plurality of images of a document being stitched together at points of connection according to embodiments of the present disclosure.

Images 501-504 comprise a plurality of images of a document. For example, a user may capture images 501-504 using camera 125 by moving client device 120 along the length of the document and sequentially taking pictures. As shown, each of images 501-504 includes a portion of the document, and some contain overlapping portions (e.g., image 501 and image 502 both contain the time and the server's name as well as portions of the date and the table number from the receipt). While not evident in FIG. 5, images 501-504 may vary in perspective, focus, lighting, and the like. Image processor 123 may perform OCR on images 501-504 to detect text present in the images and convert the detected text into a machine readable representation. Due to the conditions of an image (e.g., lighting, focus, perspective), OCR may not always be completely accurate. For example, image 503 includes the phrase from the document "TOTAL TAX", while image 504 appears to show the same phrase from the document as "TOTAL TAA". This may present difficulties in determining a point of connection between image 503 and image 504. As will be discussed below with respect to unified image 510, this problem may be addressed through the use of a similarity metric such as an edit distance.

Unified image 510 may comprise a unified image of the document formed by stitching together images 501-504 according to embodiments of the present disclosure. In the embodiment shown, image processor 123 identifies a point of connection between two images if they share at least two character sequences (e.g., line items from the receipt). As shown, points of connection 512, 514, and 516 comprise the character sequences which are shared among images 501-504. Images 501 and 502 are joined at point of connection 512, as both images share the character sequences "12:00 AM" and "Server: Eric Daniel". Images 502 and 503 are joined at point of connection 514, as both images share the character sequences "WINGS 3.00" and "SODA 2.50".

Images 503 and 504 share the character sequence "TOTAL 72.80". However, because the OCR incorrectly identified the text in image 504 as "TOTAL TAA 6.30" rather than "TOTAL TAX 6.30", image processor 123 does not recognize that images 503 and 504 share this character sequence in common. As such, image processor 123 may determine the Levenshtein or edit distance between the two character sequences. This may be triggered, for example, by image processor 123 detecting one shared character sequence between two images and a second character sequence which is not an exact match. In the example depicted, the edit distance between "TOTAL TAA 6.30" and "TOTAL TAX 6.30" is one, because only one edit is required to transform the first character sequence into the second character sequence (e.g., replacing the A with an X). Image processor 123 may store a threshold which indicates that an edit distance of two or less means that the two character sequences are the same. As such, image processor 123 determines that images 503 and 504 share two character sequences, and identifies these character sequences as a point of connection 516.

Unified image 510 results from stitching images 501-504 together at the identified points of connection 512, 514, and 516. As shown, the images are stitched together by joining them such that the shared character sequences are not duplicated, and the integrity of the text is preserved.

Figure 6:
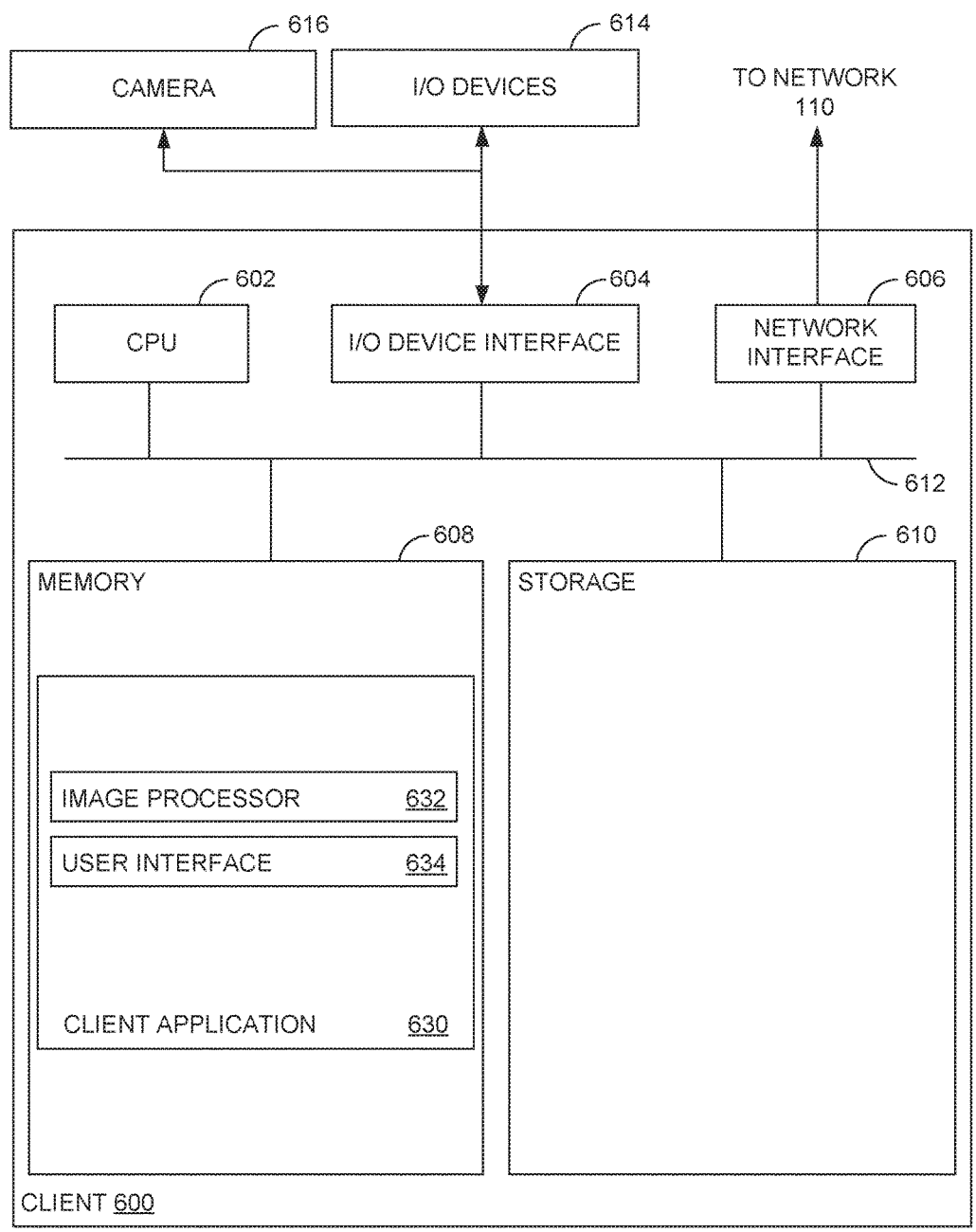
FIG. 6 illustrates a computer system with which some embodiments of the present disclosure may be implemented.

FIG. 6 illustrates an example of an electronic system 600 with which a client may be implemented. For example, as shown, the system 600 includes, without limitation, a central processing unit (CPU) 602, one or more I/O device interfaces 604 which may allow for the connection of various I/O devices 614 (e.g., keyboards, displays, mouse devices, pen input, etc.) to the system 600, camera 616, network interface 606, a memory 608, storage 610, and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, camera 616, network interface 606, memory 608, and storage 610. CPU 602 is included to be representative of a single CPU, multiple CPUs, a single CPU having multiple processing cores, and the like. Additionally, the memory 608 is included to be representative of a random access memory. Furthermore, the storage 610 may be a disk drive, solid state drive, or a collection of storage devices distributed across multiple storage systems. Although shown as a single unit, the storage 610 may be a combination of fixed and/or removable storage devices, such as fixed disc drives, removable memory cards or optical storage, network attached storage (NAS), or a storage area-network (SAN).

As shown, memory 608 includes a client application 630, which comprises an image processor 632 and user interface 634. Client application 630 may, for instance, comprise a financial services application which executes on client 600. Client application 630 may communicate with camera 616 using I/O device interface 604 in order to capture a plurality of images of a long document. The plurality of images may be provided to image processor 632 in order to perform OCR on the images, use text detected with OCR to identify points of connection among the images, and stitch the images together at the points of connection. User interface 634 may allow a user to interact with client application 630, and may display images to the user through one or more of I/O devices 613 (e.g., a display device).

Note, descriptions of embodiments of the present disclosure are presented above for purposes of illustration, but embodiments of the present disclosure are not intended to be limited to any of the disclosed embodiments. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the preceding features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for capturing a document, comprising:
   performing Optical Character Recognition (OCR) on each image of a plurality of images to identify a plurality of character sequences in the plurality of images, wherein each image comprises a portion of the document;
   determining a similarity metric between a first two consecutive character sequences of the plurality of character sequences in a first image of the plurality of images and a second two consecutive character sequences of the plurality of character sequences in a second image of the plurality of images,
   wherein the first two consecutive character sequences comprise a first verifier line and a first stitching line, and wherein the second two consecutive character sequences comprise a second verifier line and a second stitching line;

determining that the similarity metric is below a threshold;

identifying, based on the similarity metric being below the threshold, the first two consecutive character sequences and the second two consecutive character sequences as points of connection; and producing a unified image of the document by stitching the plurality of images together based on the points of connection.

2. The computer-implemented method of claim 1, wherein the first two consecutive character sequences comprise two consecutive lines of text.

3. The computer-implemented method of claim 1, further comprising:

presenting the unified image of the document to a user for approval; and extracting, from the unified image of the document, one or more values related to a transaction.

4. The computer-implemented method of claim 1, wherein, before stitching the plurality of images together, the method further comprises: presenting the points of connection to a user for approval.

5. The computer-implemented method of claim 4, further comprising:

receiving input from the user modifying one or more of the points of connection to produce modified points of connection; and generating a second unified image of the document based on the modified points of connection.

6. The computer-implemented method of claim 1, wherein the unified image of the document comprises the first two consecutive character sequences from the first image and not the second two consecutive character sequences from the second image.

7. The computer-implemented method of claim 1, wherein the similarity metric comprises an edit distance.

8. A system, comprising:

a processor; and memory storing instructions which, when executed on one or more processors, performs a method for capturing a document, the method comprising:

performing Optical Character Recognition (OCR) on each image of a plurality of images to identify a plurality of character sequences in the plurality of images, wherein each image comprises a portion of the document;

determining a similarity metric between a first two consecutive character sequences of the plurality of character sequences in a first image of the plurality of images and a second two consecutive character sequences of the plurality of character sequences in a second image of the plurality of images, wherein the first two consecutive character sequences comprise a first verifier line and a first stitching line, and wherein the second two consecutive character sequences comprise a second verifier line and a second stitching line;

determining that the similarity metric is below a threshold;

identifying, based on the similarity metric being below the threshold, the first two consecutive character sequences and the second two consecutive character sequences as points of connection; and producing a unified image of the document by stitching the plurality of images together based on the points of connection.

9. The system of claim 8, wherein the first two consecutive character sequences comprise two consecutive lines of text.

10. The system of claim 8, wherein the method further comprises:

presenting the unified image of the document to a user for approval; and extracting, from the unified image of the document, one or more values related to a transaction.

11. The system of claim 8, wherein, before stitching the plurality of images together, the method further comprises: presenting the points of connection to a user for approval.

12. The system of claim 11, further comprising:

receiving input from the user modifying one or more of the points of connection to produce modified points of connection; and generating a second unified image of the document based on the modified points of connection.

13. The system of claim 8, wherein the unified image of the document comprises the first two consecutive character sequences from the first image and not the second two consecutive character sequences from the second image.

14. The system of claim 8, wherein the similarity metric is an edit distance.

15. A non-transitory computer-readable medium comprising instructions which, when executed on one or more processors, performs a method for capturing a document, the method comprising:

performing Optical Character Recognition (OCR) on each image of a plurality of images to identify a plurality of character sequences in the plurality of images, wherein each image comprises a portion of the document;

determining a similarity metric between a first two consecutive character sequences of the plurality of character sequences in a first image of the plurality of images and a second two consecutive character sequences of the plurality of character sequences in a second image of the plurality of images, wherein the first two consecutive character sequences comprise a first verifier line and a first stitching line, and wherein the second two consecutive character sequences comprise a second verifier line and a second stitching line;

determining that the similarity metric is below a threshold;

identifying, based on the similarity metric being below the threshold, the first two consecutive character sequences and the second two consecutive character sequences as points of connection; and producing a unified image of the document by stitching the plurality of images together based on the points of connection.

16. The non-transitory computer-readable medium of claim 15, wherein the first two consecutive character sequences comprise two consecutive lines of text.

17. The non-transitory computer-readable medium of claim 15, wherein the method further comprises:

presenting the unified image of the document to a user for approval; and extracting, from the unified image of the document, one or more values related to a transaction.

18. The non-transitory computer-readable medium of claim 15, wherein, before stitching the plurality of images together, the method further comprises: presenting the points of connection to a user for approval.

19. The non-transitory computer-readable medium of claim 18, further comprising:
   receiving input from the user modifying one or more of the points of connection to produce modified points of connection; and
   generating a second unified image of the document based on the modified points of connection.

20. The non-transitory computer-readable medium of claim 15, wherein the unified image of the document comprises the first two consecutive character sequences from the first image and not the second two consecutive character sequences from the second image.

21. The non-transitory computer-readable medium of claim 15, wherein the similarity metric is an edit distance.

* * * * *